United States Patent
Degand

(10) Patent No.: US 7,323,088 B2
(45) Date of Patent: Jan. 29, 2008

(54) GLAZING PANELS

(75) Inventor: Etienne Degand, Jumet (BE)

(73) Assignee: Glaverbel, Brussels (BE)

( * ) Notice: Subject to any disclaimer, the term of this patent is extended or adjusted under 35 U.S.C. 154(b) by 513 days.

(21) Appl. No.: 10/414,564

(22) Filed: Apr. 16, 2003

(65) Prior Publication Data

US 2004/0086652 A1    May 6, 2004

Related U.S. Application Data

(63) Continuation of application No. 09/831,242, filed on Oct. 2, 2001, now abandoned.

(51) Int. Cl.
*C23C 14/35* (2006.01)
*C23C 16/00* (2006.01)

(52) U.S. Cl. .......................... 204/192.26; 204/192.27; 204/192.28; 427/163.1; 427/165; 427/284; 427/287; 427/376.2

(58) Field of Classification Search ............... 427/108, 427/109, 110, 163.1, 165, 376.2, 284, 287; 204/192.26, 192.27, 192.28

See application file for complete search history.

(56) References Cited

U.S. PATENT DOCUMENTS

| 4,035,576 A | | 7/1977 | Henry |
| 4,827,274 A | * | 5/1989 | Armbruster ................. 343/712 |
| 4,830,876 A | | 5/1989 | Dietrich et al. |
| 4,910,380 A | * | 3/1990 | Reiss et al. ................. 219/203 |
| 4,983,196 A | * | 1/1991 | Stotka ............................ 65/24 |
| 5,011,745 A | * | 4/1991 | Dietrich et al. ............. 428/630 |
| 5,071,692 A | * | 12/1991 | Jourdaine ................... 428/192 |
| 5,099,105 A | * | 3/1992 | Goerenz et al. ............ 219/203 |
| 5,162,145 A | * | 11/1992 | Schaefer ..................... 428/209 |
| 5,300,349 A | | 4/1994 | Roche et al. |

FOREIGN PATENT DOCUMENTS

| DE | 1088198 | 9/1960 |
| EP | 0084262 | 7/1983 |
| EP | 0226901 | 7/1987 |
| EP | 546365  | 6/1993 |

\* cited by examiner

*Primary Examiner*—Rodney G. McDonald
(74) *Attorney, Agent, or Firm*—Akerman Senterfitt

(57) ABSTRACT

A method of manufacturing a glazing panel comprises the steps of: a) taking a glazing panel having on one of its surfaces (i) a substantially transparent coating layer having a transformable portion, and (ii) an enamel material associated with the transformable portion of the coating layer; and b) causing an interaction between the transformable portion of the coating layer and the enamel material associated therewith by healing the glazing panel to a temperature above about 300° C. This may render a portion of the coating layer less susceptible to corrosion and/or non-conductive to electricity.

14 Claims, 1 Drawing Sheet

GLAZING PANELS

This application is a Continuation of application Ser. No. 09/831,242 filed on Oct. 2, 2001 now abandoned.

This invention relates to glazing panels and particularly but not exclusively to automotive glazing panels provided with coating layers.

One or more coating layers may be applied to a glazing panel to enhance its performance, for example, to render the panel electrically heatable, to provide solar control or to reduce reflection. Such coating layers may comprise a single coating film or a stack of coating films.

In some instances, it is not desirable for the entire glazing panel to be covered with the coating layer. If the coating layer is to be electrically heated. for example to de-mist the rear screen of a car window, it may be desirable for the perimeter of the rear screen to be electrically isolated. Alternatively, if the coating layer is a solar control coating sandwiched between two panes of glass of a laminated car windscreen it may be desirable for the perimeter to be rendered insusceptible to corrosion which could otherwise cause undesirable coloured spots or stains (notably where the coating layer comprises one or more layers of silver).

It has previously been proposed to mechanically remove a coating layer around the periphery of a glazing panel, for example by abrasion, or to mask the periphery of the glazing panel prior to depositing the coating. Chemical removal of portions of a coating layer, in particular by acid attack, are also known. Nevertheless, these methods all present certain disadvantages, notably in terms of the aesthetic result produced and the difficulties of being practised on an industrial scale.

According to one aspect, the present invention provides a method as defined in claim 1.

The coating layer may be electrically conductive. The coating layer may cover substantially an entire surface of the glazing panel or substantially the entire central portion of a surface of the glazing panel.

The interaction between the transformable portion of the coating layer and the band of an enamel material associated therewith preferably changes the properties of the transformable portion of the coating layer. For example:

where the coating layer is electrically conductive, the interaction may render the tansformable portion of the coating layer non-conductive, preferably without rendering other portions of the coating layer non-conductive; and/or the interaction may render the transformable portion of the coating layer less susceptible to corrosion.

The interaction may cause chemical changes to the transformable portion of the coating layer and may result from diffusion between the transformable portion of the coating layer and the band of an enamel material associated therewith. In this latter case, the transformable portion of the coating layer may be substantially absorbed into the band of an enamel material associated therewith so that only the enamel material is visible with the naked eye through the glazing panel.

The interaction may be caused by heating the glazing panel to a temperature above about 300° C., 350° C., 375° C., 400° C., 425° C., 450° C., 475° C., 500° C., 525° C., 550° C., 575° C., 600° C., 625° C., 650° C., 675° C. or 700° C. It may not be essential for the entire glazing panel to be reach such a temperature but merely the portion at which the interaction is intended to occur.

The heating of the glazing panel may cause local destruction, break down or disintegration of the transformable portion of the coating layer. Where the enamel is a black or dark coloured enamel, this may occur due to the enamel material associated with the transformable portion of the coating layer causing local "overheating" of the transformable portion of the coating layer.

Clearly, there may be more than one transformable portion of the coating layer, each transformable portion having an enamel material associated therewith.

Where the coating is substantially electrically conductive it may have a resistance of less. than 30 ohms per square. Preferably, such a coating has a resistance of less than 20, 15 or 10 ohms per square; such resistances may be achieved with pyrolytic coatings based on, for example, doped tin oxide. Even more preferably, such a coating has an electrical resistance of less than 6, 5, 4, 3 or 2 ohms per square; such resistances may be achieved with sputtered coatings having one or more spaced silver containing layers.

The enamel material is preferably positioned over the transformable portion of the coating layer. This allows the coating layer to be deposited over the entire surface of a large sheet of glass, for the sheet of glass to be subsequently cut to the desired dimensions of the glazing panel and for the enamel material to then be deposited over the coating layer. This greatly facilitates production, notably because it avoids the difficulties and associated expense of applying a coating layer to glazing panels which have already been cut to their desired size.

Alternatively, the coating layer may be deposited over an enamel material which has previously been deposited on the glazing panel.

The enamel material may serve one, and preferably a combination of the following functions: It may:

reduce susceptibility of the coating layer (and particularly the edge of the coating layer) to corrosion and/or provide an aesthetic masking band, for example to hide the fixation of the glazing panel to a supporting structure and/or electrically isolate a portion of an electrically conductive coating layer and/or mask vision through a portion the glazing panel and/or wholly or partially mask an electrical connector associated with an electrically conductive coating layer.

The invention may be advantageously used where the coating layer extends to the periphery of the glazing panel and the enamel material forms an opaque band around the periphery.

The coating layer may be a solar control filter, an electrically conductive film, a low emissivity filter or some other type of coating; it may be deposited by sputtering, by pyrolysis from one or more liquid precursors, by pyrolysis using chemical vapour deposition or in any other suitable way.

The enamel material associated with the transformable portion of the coating layer may comprise silver. This is believed to facilitate interaction with a coating layer which comprises one or more silver layers.

According to further aspects, the present invention provides for use of a method as defined in claim 10, an automotive vehicle glazing as defined in claim 11 and a glazing panel as defined in claim 12.

Examples of the present invention will now be described, by way of example only, with reference to the accompanying drawings of which:

Figure 1:
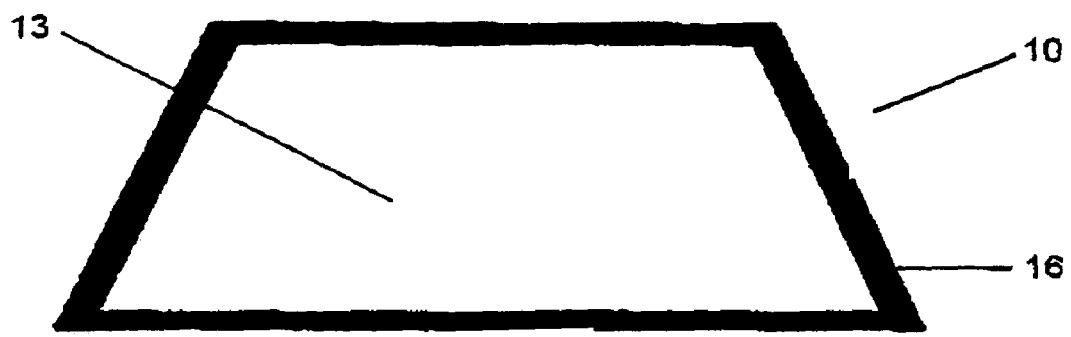
FIG. 1 is a plan view of a glazing panel which forms part of a car windscreen.

To facilitate clarity, the thicknesses of the layers shown in the figures have not been drawn to scale.

According to one example, the invention is performed using a glass glazing panel 10 intended to form one sheet of a laminated car windscreen. By convention the faces of a glazing panel are counted from the exterior of the structure (position 1) to the interior. Position 2 of a monolithic structure is thus the interior face (i.e. facing towards the inside of the vehicle or building to which it is attached) whilst for a laminated structure position 2 is the interior face of the external sheet (which contacts the laminating pvb layer, for example in current windscreens)).

The glazing panel 10 carries a coating layer 13 in position 2 which extends to the edges 14 of the glazing panel. The coating layer is an electrically heatable, solar control coating deposited by magnetron sputtering and consists of the following layers: ZnO antireflective layer/Ti barrier/Ag infra red reflecting layer/Ti barrier/ZnO antireflective layer/Ti barrier/Ag infra red reflecting layer/Ti barrier/ZnO antireflective layer. Coating layers of this type are well known in the art and the present invention is not limited to this particular type of coating layer. The invention is particularly effective for use with vacuum coated layers, for example sputtered layers, which are not generally mechanically resistant. Nevertheless, it may also be beneficial when applied to "hard" coating layers, for example, those formed pyrolitically. It is especially useful with coating layers which are heat treatable by, for example bending and/or tempering, and can thus be applied to a flat sheet of glass which is subsequently shaped and or heat treated.

Figure 2:
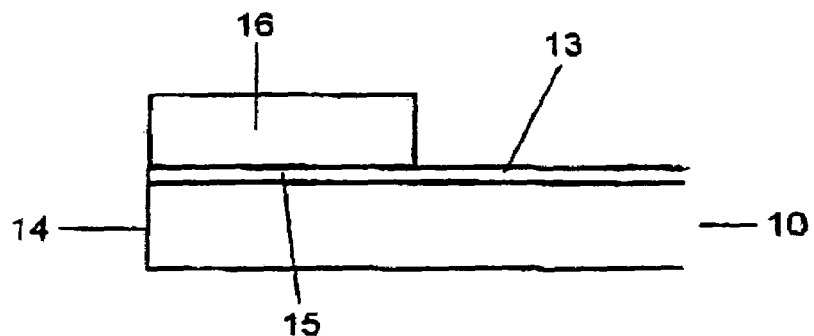
FIG. 2 is a section of an edge portion of the glazing panel of FIG. 1 prior to heating.

As shown in FIG. 2, the coating layer 13 has a transformable portion 15 which in this case. forms a band around the entire periphery of the glazing panel. A band of enamel 16 is associated with the transformable portion 15 of the coating layer, in this case being silk screen printed over the coating layer 13. In this example, the transformable portion 15 of the coating layer is situated directly below and in direct contact with the enamel material 16 though this need not always be the case.

Good results may be obtained using the enamel 1T55M056 supplied by Johnson-Matthey which, after firing has the following components:

| | |
|---|---|
| Si | 15.5 |
| Bi | 42.2 |
| Al | 0.142 |
| Mn | 0.145 |
| Mg | 0.138 |
| Ca | 0.284 |
| Na | 0.843 |
| K | 0.367 |
| Ti | 2.95 |
| P | 0.0226 |
| Fe | 0.134 |
| Mo | |
| Co | |
| Cr | 20.5 |
| Cu | 12.9 |
| Ag | 2.33 |
| Ni | 0.0363 |
| Zr | |
| B | 1.82 |
| Ba | |
| Sr | |
| Y | |
| Hf | |
| S | 0.0925 |
| Cl | 0.0418 |
| Pb | |

The principle components of this enamel are ($Bi_4(SiO_4)_3$) and ($Bi_4Ti_3O_{12}$). When applied to the glazing panel prior to firing the enamel also contains solvents, for example, polyvinylpyrrolidone (PVP) and xylene; these evaporate when the enamel is heated.

When this particular enamel is used in position 2 of a laminated structure it is preferred to carry out a heating process with the enamel exposed to the atmosphere. This may provide a "pre-firing" or evaporation process which can reduce the risk of blisters forming in the enamel in position 2 if the glazing panel is subsequently heated with a sheet of glass overlying the enamel due to evaporated gasses from the enamel being trapped. In this example, the glazing panel is initially raised to a temperature of about 450° C. with the enamel material exposed to the atmosphere.

The glazing panel was then assembled with another sheet of glass, the other sheet of glass lying in contact with the face at position 2 of the glazing panel, and subjected to a bending and tempering process reaching a temperature of about 650° C. in preparation for the glazing panel and the other sheet of glass to be laminated together using a sheet of pvb to form a windscreen.

Heating of the glazing panel caused an interaction between the band of enamel 16 and the transformable portion 15 of the coating layer.

If an enamel suitable for firing in position 2 is used, the heating operation may be carried out as part of a bending and/or tempering operation. Particularly in cases where the glazing panel does not require bending simultaneously with an associated sheet of glass, the heating of the present invention is preferably carried out during a bending and/or tempering and/or heat treatment process. This is particularly the case for monolithic glazings, for example, rear windows, side windows and sunroofs for vehicles.

In the present case, the transformation renders the transformable portion 15 of the coating layer non-conductive to electricity and reduces its susceptibility to corrosion. As the transformation portion forms a band around the edge of the glazing panel this may not only prevent corrosion at the edge of the glazing but also provide an effective barrier which prevents corrosion of the rest of the coating layer.

Figure 3:
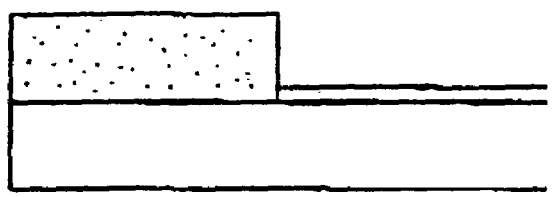
FIG. 3 is a section of an edge portion of the glazing panel of FIG. 1 after heating.

As shown in FIG. 3, after the heat treatment, only the enamel band is visible through the glazing panel and it is not visually perceivable with the naked eye that the enamel band and the transformable portion 15 of the coating layer were originally superimposed.

The structure of the enamel material may be altered by the heating step and solvents initially present in the enamel material may evaporate. Nevertheless, once the enamel material has been applied to the glazing panel it is not removed but is incorporated in the finished glazing panel. This avoids the need for a washing or removing operation which is commonly required with acid attack techniques for removing coating films.

Figure 4:
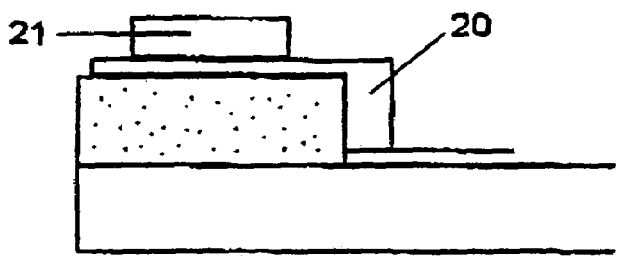
FIG. 4 is a simplified section similar to FIG. 2 showing a further embodiment.

In FIG. 4, the enamel band also masks an electrical connector 21 and a portion of a silver containing frit 20 intended for providing electrical power for heating the coating layer.

The invention may be used with a wide variety of glazing panels, for example, vehicle windscreens, vehicle rear windows, vehicle sunroofs, vehicle side windows and architectural glazing panels.

The utility of the invention is not limited to any particular mechanism of interaction between the transformable portion of the coating layer and the enamel material. Nevertheless, when the coating layer contains at least one layer of silver it is thought that one mechanism which causes transformation of the transformable portion of the coating layer may be agglomeration or conglomeration of the silver of the coating layer so that the silver forms into discontinuous pools. This may then be incorporated into the structure of the enamel. This may be detectable by examining the concentration of silver at the surface of the enamel material after the interaction, particularly if the coating layer was originally deposited over the enamel layer.

The invention claimed is:

1. A method of manufacturing a glazing panel, comprising the steps of:
   a) taking a glass glazing panel having on one of its surfaces
      (i) a substantially transparent coating layer comprising one or more layers of silver, said substantially transparent coating layer extending to the periphery of the glazing panel and having a transformable portion, and
      (ii) an enamel material associated with the transformable portion of the coating layer, said enamel material being adapted to form an opaque band around the periphery of the glazing panel; and
   b) causing an interaction between the transformable portion of the coating layer and the enamel material associated therewith by heating the glazing panel to a temperature above about 300° C. which renders the transformable portion of the coating substantially non-conductive to electricity; and
   c) laminating the glazing panel with another glass sheet to form a laminated glazing with the coating layer sandwiched between the two panes of glass of the laminated glazing.

2. A method in accordance with claim 1, in which prior to heating of the glazing panel the enamel material is positioned over the transformable portion of the coating layer.

3. A method in accordance with claim 1, in which the coating layer is deposited over an enamel material which has been previously deposited on the glazing panel.

4. A method in accordance with claim 1, in which the coating layer is a sputter deposited solar control coating layer.

5. A method in accordance with claim 1, in which heating of the glazing panel causes substantial destruction of the transformable portion of the coating layer.

6. A method in accordance with claim 1, in which the substantially transparent coating layer has an electrical resistance of less than 6 ohms per square.

7. A method in accordance with claim 1, in which the glazing panel is an automotive windscreen.

8. A method in accordance with claim 7, in which the coating layer is arranged at position 2 of the automotive windscreen.

9. A method in accordance with claim 1, in which the glazing panel is heated to a temperature above about 425° C. to cause the interaction between the transformable portion of the coating layer and the enamel material associated therewith.

10. A method in accordance with claim 1, in which the glazing panel is heated to a temperature above about 625° C. during a bending process to cause the interaction between the transformable portion of the coating layer and the enamel material associated therewith.

11. A method in accordance with claim 1, in which visual inspection of the glazing panel fails to reveal that the enamel material was deposited over the transformable portion of the coating layer rather than being deposited in the absence of the coating layer.

12. A method in accordance with claim 1, further comprising the step of:
   d) arranging an electrical connector at least partially over the enamel material, the electrical connector being electrically connected to the coating layer.

13. A method in accordance with claim 1, in which the interaction between the transformable portion of the coating layer and the enamel material associated therewith reduces edge corrosion of the coating layer.

14. A method of manufacturing a laminated automotive windscreen comprising the steps of:
   a) taking a glass glazing panel having on one of its surfaces
      (i) a substantially transparent, sputter deposited solar control coating layer comprising one or more layers of silver, said substantially transparent coating layer extending to the periphery of the glazing panel and having a transformable portion, and
      (ii) an enamel material associated with the transformable portion of the coating layer, said enamel material being adapted to form an opaque band around the periphery of the glazing panel; and
   b) causing an interaction between the transformable portion of the coating layer and the enamel material associated therewith by heating the glazing panel to a temperature above about 300° C. which renders the transformable portion of the coating substantially non-conductive to electricity and less susceptible to corrosion; and
   c) laminating the glazing panel with another glass sheet to form the laminated automotive windscreen such that the coating layer is sandwiched between the two panes of glass of the laminated windscreen.

* * * * *